Patented Dec. 9, 1924.

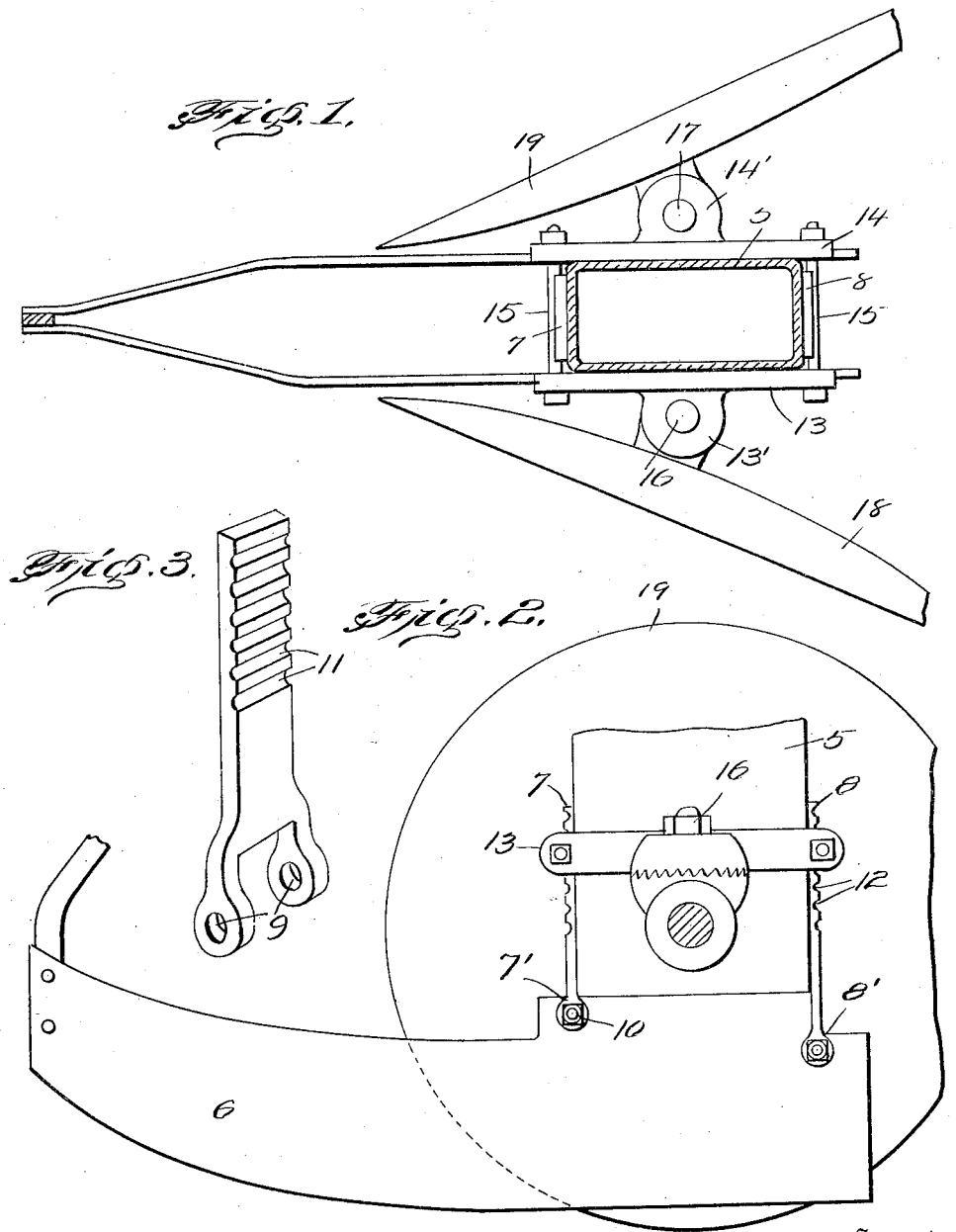

1,518,177

UNITED STATES PATENT OFFICE.

HERBERT W. CARPENTER, OF BYERS, TEXAS.

CULTIVATOR-DISK ATTACHMENT FOR PLANTERS.

Application filed May 27, 1924. Serial No. 716,189.

*To all whom it may concern:*

Be it known that I, HERBERT W. CARPENTER, a citizen of the United States, residing at Byers, in the county of Clay and State of Texas, have invented certain new and useful Improvements in Cultivator-Disk Attachments for Planters, of which the following is a specification.

This invention relates generally to planting machines and has more particular reference to an attachment therefor, whereby during the operation of the planter, the dirt will be thrown upon the seeds discharged from the usual planter chutes for thereby preventing the stealing of the seeds by birds or fowl.

The primary object resides in the provision of means whereby a pair of rotary disk cultivators may be attached to the planter chute upon opposite sides thereof and wherein the angle of these disks may be adjusted relative to each other and whereby the same may be positioned at a plurality of points with respect to the chute for thereby adjusting the cut of the disks.

A still further object is to provide a cultivator disk attachment that is relatively simple in construction, and one that may be readily applied to or removed from all forms of cultivator chutes in a simple and expeditious manner.

With the foregoing and other objects in view as the nature of the invention will be better understood the same comprises the novel form, combination and arrangement of parts hereinafter more fully described, shown in the accompanying drawing and claimed.

In the drawing wherein like reference characters indicate corresponding parts throughout the several views:

Figure 1 is a sectional view through a conventional form of planter chute equipped with my novel cultivator disk attachment.

Figure 2 is a fragmentary side elevational view showing the disk attachment applied to the chute, and Figure 3 is a perspective view of a bar member which constitutes an essential part of the present invention.

Now, having particular reference to the drawing, 5 indicates a well known form of hollow seed chute that comprises a part of practically all forms of seed planters, the same being equipped at its lower end with a conventional runner 6.

My invention per se, constitutes the provision of a pair of flat metal bars 7 and 8 that are adapted to be vertically positioned in close contact upon the rear and upper sides respectively of said chute 5. The lower ends of these bars are respectively bifurcated as at 7' and 8', the legs of the bifurcations being formed with registering openings 9 that register with transverse openings in the runner 6 upon opposite sides of the chute when the yoked ends of these bars are disposed over the runner in a manner as clearly shown in Figure 2. Preferably bolt and nut connections 10 are employed in the securing of the lower ends of these bars to said runner.

The outer faces of the bars 7 and 8 are formed throughout the greater portion of their length with spaced transverse semicircular channels 11 and 12 respectively, and adapted to be positioned upon opposite sides of the chute 5 are metal strips 13 and 14, the ends of which project beyond the front and rear sides of the chute and are formed at said ends with openings whereby these strips may be secured together and in close contact with the opposite sides of the chute through the medium of cross bolts 5 that are obviously to be selectively arranged within alined channels of the bars 7 and 8. Said strips 13 and 14 are formed upon their outer sides and intermediate their ends with laterally extending ears 13' and 14' respectively, to which are to be adjustably pivotally secured as at 17 and 16 concavo-convex disk cultivators 18 and 19 that are to be so adjusted as to converge inwardly at the rear side of the chute 5, whereby during the movement of the planter the dirt will be drawn inwardly and thrown over the seeds discharged from the chute 5.

It will thus be seen that I have provided a highly novel and efficient form of cultivator disk attachment for planters and one wherein the disks shown and described may be vertically adjusted with respect to the planter chute 5, and wherein the angle of disks with respect to the chute may also be adjusted in an obvious manner.

Minor changes may be made in the invention without departing from the spirit and scope of the appended claim.

Having thus described my invention, what I claim as new and desire to secure by Letters Patent, is:

In combination with a planter chute, bar members arranged vertically at the front and rear sides of the chute and being formed upon their outer faces with cross channels, strip members arranged cross wise of the chute upon the remaining sides thereof and adapted to be secured together by cross bolts, said cross bolts adapted to be arranged in selective channels of the bars whereby said strips are secured in vertically adjusted positions upon said chute and disk cultivators pivotally secured to said cross strips.

In testimony whereof I affix my signature.

HERBERT W. CARPENTER.